(12) United States Patent
Knott et al.

(10) Patent No.: US 7,018,458 B2
(45) Date of Patent: Mar. 28, 2006

(54) USE OF ORGANOFUNCTIONALLY MODIFIED POLYSILOXANES CONTAINING PHENYL DERIVATIVES AS DISPERSANTS AND WETTING AGENTS FOR FILLERS AND PIGMENTS IN AQUEOUS PIGMENT PASTES AND INK OR PAINT FORMULATIONS

(75) Inventors: Wilfried Knott, Essen (DE); Kathrin Lehmann, Leverkusen (DE); Stefan Silber, Krefeld (DE)

(73) Assignee: Goldschmidt GmbH, Essen (DE)

( * ) Notice: Subject to any disclaimer, the term of this patent is extended or adjusted under 35 U.S.C. 154(b) by 29 days.

(21) Appl. No.: 10/622,610

(22) Filed: Jul. 18, 2003

(65) Prior Publication Data

US 2005/0257717 A1    Nov. 24, 2005

(30) Foreign Application Priority Data

Jul. 19, 2002    (DE) ................................ 102 32 908

(51) Int. Cl.
     *C09D 11/10*    (2006.01)
(52) U.S. Cl. ............... 106/31.6; 106/31.89; 106/31.9; 106/400; 106/414; 106/436; 106/456; 106/472; 523/160; 523/161; 524/588; 525/474; 528/25; 528/31; 528/43
(58) Field of Classification Search ................ 528/25, 528/31; 428/405
See application file for complete search history.

(56) References Cited

U.S. PATENT DOCUMENTS

| | | | |
|---|---|---|---|
| 3,980,602 A | | 9/1976 | Jakubauskas |
| 4,070,313 A | * | 1/1978 | Papa .......................... 521/110 |
| 5,035,748 A | * | 7/1991 | Burow et al. ............... 106/499 |

FOREIGN PATENT DOCUMENTS

| | | |
|---|---|---|
| DE | 41 40 793 C1 | 3/1993 |
| DE | 44 16 336 A1 | 11/1995 |
| EP | 0 311 157 B1 | 4/1989 |
| EP | 0 546 486 A2 | 6/1993 |
| EP | 0 546 407 A2 | 8/1993 |
| EP | 0 731 148 A2 | 2/1996 |
| JP | 04342520 A * | 11/1992 |
| WO | WO 94/18260 | 8/1994 |
| WO | WO 94/21701 | 9/1994 |
| WO | WO 01/60925 A2 | 8/2001 |
| WO | WO 02/14415 A1 | 2/2002 |

OTHER PUBLICATIONS

Schröder et al; "Energetische Betrachtungen zu löse- und bindemittelhaltigen Pigmentdispersionen", pp. 11-16.
Hildred et al, "Acrylate als Additive für wässrige Beschichtungsstoffe", farbe+lack, 96, Jahrgang, Nov. 1990, pp. 857-859.
Staffel et al, "Einsatz von kondensierten Phosphaten als Dispergiermittel", farbe+lack, 100, Jahrgang, Jul. 1994, pp. 523-527.
Schöberl et al, "Ökologisch relevante Daten von Tensiden in Wasch-und Reinigungsmitteln", Tenside Surfactants Detergents 25 (1988) pp. 86-97.
Nimrod et al, "Environmental Estroxylates Effects of Alkylphenol Ethoxylates", Crtical Reviews in Toxicology, 26(3):335-364 (1996).
Frahn et al, "New Modified Silicon Dioxides for Radiation Cured Coatings", pp. 147-156 (English), pp. 89-99 (German).
J. Bieleman, "Replacement of Alkylphenolethoxylate Additives", Coatings and the Environment, p. 14, (1995).

\* cited by examiner

*Primary Examiner*—Marc S. Zimmer
(74) *Attorney, Agent, or Firm*—Frommer Lawrence & Haug LLP

(57) ABSTRACT

The invention relates to the use of organofunctionally modified polysiloxanes containing phenyl derivatives as dispersants for preparing aqueous pigment formulations, paints, coating materials, and coatings. For the purposes of this invention the term "polysiloxanes" shall be understood to embrace oligomeric siloxanes as well.

12 Claims, No Drawings

USE OF ORGANOFUNCTIONALLY MODIFIED POLYSILOXANES CONTAINING PHENYL DERIVATIVES AS DISPERSANTS AND WETTING AGENTS FOR FILLERS AND PIGMENTS IN AQUEOUS PIGMENT PASTES AND INK OR PAINT FORMULATIONS

RELATED APPLICATIONS

This application claims priority under 35 USC § 119 to German application No. 102 32 908.7, filed Jul. 19, 2002, herein incorporated by reference.

BACKGROUND OF THE INVENTION

1. Field of the Invention

The invention relates to the use of organofunctionally modified polysiloxanes containing phenyl derivatives as dispersants and wetting agents for fillers and pigments in aqueous pigment pastes and/or ink and paint formulations. For the purposes of this invention the term "polysiloxanes" shall be understood to embrace oligomeric siloxanes as well.

2. Background of the Invention

For the dispersing of fillers and pigments in liquid media the assistance of dispersants is necessary for a variety of reasons and is therefore state of the art:

improved wetting of the fillers and pigments during incorporation, resulting for example in shorter dispersing times and lower input of dispersing energy;

reduced viscosity of the pigment pastes or of inks and paints, allowing more efficient dispersion to give more highly concentrated pastes;

development of optimum color strength and also of optimum hiding power in the case of opaque pigments;

development of high degrees of gloss particularly in aqueous dispersions drying by means of coalescence;

prevention of the settling tendency in pigment pastes during months of storage, in transit over long distances, and under extreme climatic stress, as must be guaranteed in the case of pigments with a high density such as titanium dioxide, for example;

avoidance of flocculation, particularly important for ensuring reproducible shades in the color mixing machines which are nowadays customary, realization of compatibility with a large number of binders used for let down.

In order to meet these diverse requirements imposed on dispersants both during the preparation and in the storage period of pastes, inks, and paints a multiplicity of water-soluble dispersant structures have already been proposed.

In addition to the use of inexpensive ionic structures particularly for fillers and oxide pigments based on polyphosphates (Ullmann's Encyclopedia of Industrial Chemistry, Sixth Edition, section 3.2.6., 2002; Th. Staffel, Farbe & Lack 100, 1994) and polyacrylic acids (WO-A-02/14415, WO-A-01/60925, J. Schröder, Farbe & Lack 91, 1985, 11; R. Hildred, Farbe & Lack, 1990, 857–859) a broad sphere of application in the production of inks and paints has been occupied by amphiphilic structures based on nonionic fatty alcohol ethoxylates or alkylphenol ethoxylates and/or their anionically modified derivatives (J. Bieleman, PPCJ 3, 1995, 17; P. Quednau, ACT '98, Paper No. 29; H. Frommelius, VILF (German Paint and Ink Engineers Association) 2000 Annual Conference, 41).

A substantial disadvantage of the first-mentioned structures is their suitability solely for oxide pigments but not for hydrophobic organic pigments. Another drawback is the inadequate long-term stability of the pastes produced using them and the heavy dependence of the viscosities on the use concentration and electrolyte concentration, which may vary not only through the introduction of charges by different pigments but also through the use of the water which is customary in the manufacture of pastes, inks, and paints.

In principle these last-mentioned problems also occur in connection with the ionic fatty alcohol or alkylphenol ethoxylate (APE) derivatives, which also tend toward strong foam stabilization, resulting not only in production problems but also, in many cases, in a reduced gloss.

The nonionic derivatives which are suitable for organic pigments frequently exhibit inadequate affinity and viscosity reduction for oxide pigments.

Although alkylphenol ethoxylates offer better pigment wetting and greater permanence than conventional linear or branched fatty alcohols, their ecotoxicology is increasingly imposing pressure for them to be substituted in the inks and paints industry (Journal of Surfactants and Detergents, Vol. 5, No. 1, (2002); Critical reviews in Toxicology, 26(3): 335–364, (1996); P. Schöberl, Tenside Surfactants Detergents 25, 1988, 2, 86; K. Fent, Swiss Federal Institute for Environmental Science and Technology).

There have without doubt been a multiplicity of efforts to find a response to the requirements of dispersants by means of polymeric structures.

Descriptions are given, for example, of water-soluble polyiso-cyanate adducts containing hydrophilic polyether chains (EP-A-0 731 148), hydrophilic polyurethane-polyureas (DE-A-44 16 336), poly(meth)acrylates (U.S. Pat. No. 3,980,602, WO-A-94/21701), and also special polyesters (WO-A-94/18260) or else copolymers based on vinyl monomers (styrene, vinylimidazole, etc.) with acrylate-functional monomers (acrylic acid, BuAc, HEA), as in EP-B-0 311 157.

As well as disruptive or even toxic residual monomer fractions there is frequently no universal compatibility with the typical binder systems.

Owing to molar weight, monomers, or long polyethylene oxide chains, which are needed for water solubility, the resultant products are frequently solid and by neutralization can generally be formulated only as 40% strength aqueous solutions, thereby restricting the user in the production of highly concentrated pastes.

A strong inherent color on the part of amino-containing polymers or the adverse influencing of water resistance and/or weathering stability in pigmented inks and paints is an additional restriction on the use of such structures.

A further serious disadvantage lies in the relatively large amounts that are required of polymeric structures particularly for titanium dioxide—one of the most frequently used pigments.

The effectiveness of polymeric structures in terms of long-term paste stability as a result of polyfunctional anchor possibilities is countered by high production costs, arising from the polymerization and possible polymer-analogous reactions.

From DE-C-41 40 793, EP-A-0 546 407, and EP-A-0 546 406 it is known that silicone oils and also silane-based structures such as methacryloyloxypropyltrimethoxysilane (VILF, volume 3, Annual Conference November 2000; 6th Nuremberg Congress, p 147 ff., April 2001) are capable of coating even oxide surfaces in order to produce greater compatibility with the surrounding organic medium, by making the surface water repellent and reducing the viscosity, and so to guarantee greater efficiency of the pigments employed.

Generally speaking, however, the pigments in question are those which are used in plastics applications, such as for the production of pigment masterbatches in polyethylene or polypropylene.

In ink and paint applications silanes are utilized for modifying inorganic materials in order to make the polar surfaces, which are the cause of particle agglomeration and high viscosity in an organic system, of the appropriate organofunctional silanes sufficiently organophilic and so to improve the wetting afforded by the organic polymer (Degussa brochure "Anwendung von organofunktonellen Silanen—DYNASYLAN"). Silicas treated in this way are employed in UV-curing systems, which are fundamentally different from these aqueous applications.

OBJECTS OF THE INVENTION

It is an object of the present invention to avoid the abovementioned disadvantages of the low molecular mass and polymeric surfactant structures and to find a structure which stabilizes not only hydrophilic oxide pigment and filler surfaces but also hydrophobic pigments and is used in a concentration which is as low as possible.

Surprisingly it has been found that certain organofunctionally modified polysiloxanes containing phenyl derivatives can be used very universally in respect of the dispersion of pigment and filler grades in different binder systems. These and other objects will become apparent in the description of the invention.

DESCRIPTION OF THE INVENTION

The invention accordingly provides for the use of organofunctionally modified polysiloxanes of the general formula (I)

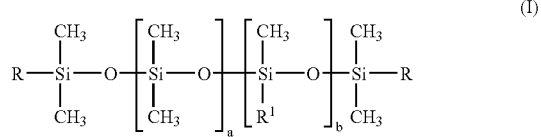

in which

R is in each case identical or different from $R_1$ or —$CH_3$,
$R_1$ is —$(CH^2)_c$—O—$(CH_2$—CH(Ph)—O$)_e$—$(C_nH_{2n-x}R^2_x$—O$)_d$—$R^3$ and/or $R^{1'}$=—$CH_2$—CHR*—Ph,
R* is H or —$CH_3$,
$R^2$ is an alkyl residue, preferably having 1 to 5 carbon atoms, preferably —$CH_3$,
Ph is a phenyl derivative having the general formula

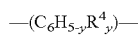

in which
$R^4$ is a hydroxyl residue, an alkyl residue, preferably having 1 to 6 carbon atoms or an alkoxy residue preferably having 1 to 6 carbon atoms, and
y is a number from 0 to 5, preferably 0 to 2,
$R^3$ is hydrogen, an alkyl chain, preferably having 1 and up to 18 carbon atoms, a benzyl residue, an alkyl-substituted benzyl residue preferably, having up to four carbon atoms in the alkyl residue, a group $COR^5$ with a residue $R^5$ which has an alkyl chain, preferably having 1 to 18 carbon atoms, a group $CONHR^6$ with a residue $R^6$ which comprises a hydrogen atom or an alkyl chain, preferably having 1 to 18 carbon atoms, or $CO_2R^7$, which has an alkyl chain $R^7$, preferably having 1 to 18 carbon atoms,
c is from 2 to 6, preferably 2 or 3,
d is from 3 to 70, preferably from 3 to 50,
e is 0,≧1, preferably from 1 to 5, with the proviso that if e is 0 the value of b is >1 and the residue $R^1$ is present at least once in the molecule,
n is from 2 to 4, preferably 2 or 3,
x is 0 or 1,
a is from 0 to 100,
b is from 1 to 100,
with the proviso that a+b=1 to 100, preferably up to 50 and in particular up to 25, for producing aqueous pigment formulations, coating materials, paints and coatings.

The value of b and the value of a are to be understood as average values in the polymer molecule, since the polysiloxanes of the invention are in the form of mixtures, which are generally equilibrated mixtures.

In the residues (Ph)=—$(C_6H_{5-y}R^4_y)$—$R^4$ is a monovalent residue which in each case can be identical or different and is selected from the groups consisting of an alkyl residue, preferably having 1 to 6 carbon atoms, an alkyloxy residue or hydroxyl residue. Preference is given to methyl residues, the hydroxyl residue, and alkoxy residues having 1 to 6 carbon atoms. The index y is a number from 0 to 5. With particular preference y is 0 or 1 and particularly preferred substituents are the methyl and ethyl residue.

The polyether residue

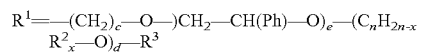

is obtained by reaction of an unsaturated starter alcohol $CH_2$=CH—$(CH_2)_z$—OH with z (=0 to 2), which is preferably allyl alcohol or vinyl alcohol, by addition reaction with monomers in accordance with the known methods. Suitable monomers are ethylene oxide, propylene oxide, tetrahydrofuran, butylene oxide, isobutylene oxide, and, for the aromatic moiety Ph of the polyether, preferably styrene oxide, with c being from 2 to 6, preferably 2 or 3, e is 0, ≧1, preferably from 1 to 5, with the proviso that if e is 0 b is >1 and the residue $R^1$ is present at least once in the molecule, n is from 2 to 4, preferably 2 or 3, x is 0 or 1, and d is from 3 to 70, preferably from 3 to 50; $R^3$ here can be hydrogen, an alkyl chain, preferably having 1 and up to 18 carbon atoms, a benzyl residue, an alkyl-substituted benzyl residue, preferably having up to 4 carbon atoms in the alkyl residue, a group $COR^5$ with a residue $R^5$ which comprises an alkyl chain, preferably having 1 to 18 carbon atoms, a group $CONHR^6$ with a residue $R^6$ which comprises a hydrogen atom or an alkyl chain, preferably having 1 to 18 carbon atoms, or $CO_2R^7$, which comprises an alkyl chain $R^7$ preferably having 1 to 18 carbon atoms. $R^3$ is preferably a hydrogen, an acetyl group or a methyl residue.

Within the polyether the blocks —$(CH_2$—CH(Ph)—O$)_e$ and —$(C_nH_{2n-x}R^2_x$—O)— may be either randomly distributed or in the form of blocks. The indices d and e are average numbers, since it is known that the addition reaction of epoxides with alcohols produces a mixture of compounds differing in chain length. The molar percentage of Ph in $R^1$ and/or $R^{1'}$ in the form of —$(CH_2$—CH(Ph)—O$)_e$— and —$CH_2$—CHR*—Ph is preferably at least 20%, more preferably at least 30%. In the residue —$(C_nH_{2n-x}R^2_x$—O$)_d$— the fraction of (n=2): (n>2) is in the range from about 4:0 to 1:1.

The polyether residues can be introduced into the polysiloxane molecule by addition reaction of the compounds $CH_2=CH-(CH_2)-(CH_2)_z-O-(CH_2-CH(Ph)-O)_r-(C_nH_{2n-x}R^2_x-O)_d-R^3$ and/or $CH_2=CR^*-Ph$ with SiH groups of the polysiloxane of the general formula

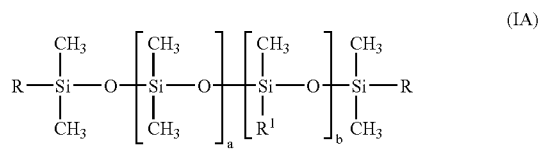

(IA)

in which
$R^1$ is H,
R is $R^1$ or $-CH_3$,
$R^*$ is H or $-CH_3$, in the presence of hydrosilylation catalysts such as, for example, cis-$[PtCl_2(NH_3)_2]$, $H_2PtCl_6 \cdot 6H_2O$, and $Pt_2Cl_4(C_6H_{10})_2$ by the known methods of the prior art.

The term "pigment formulations" embraces not only the pastes produced by direct dispersion but also the formulations which result when using pigment pastes (full mixing and tinting).

In the case of direct dispersion the complete pigment/filler mixture is dispersed in the binder in the millbase and is subsequently used with the remaining paint components for a let down. All dispersing additives used in accordance with the invention can be employed for this application. Rub-out effect is prevented and the color strength is improved.

In the case of preparation by way of pigment pastes (full mixing) the pigments are first of all dispersed individually in a highly concentrated paste. This allows the dispersing operation to be optionally tailored to the respective pigment. These pastes are mixed (depending on the desired shade) with the ready-formulated clear varnish, which contains all of the remaining paint components (binders, additives, solvents, etc.). These pigment pastes can also be used for tinting existing white paints or for correcting the shade of finished colored paints and coatings so called tinting pastes. Pigment pastes can be prepared using special dispersing resins or else in binder-free form. There is no reason not to use the dispersing additives claimed in accordance with the invention in direct dispersion, i.e., where two or more pigments and/or fillers are dispersed together with the binder to form the finished paint or to give the final shade.

The wetting and dispersing additives specified below can be used particularly for binder-free pigment pastes but also for binder-containing pigment pastes.

Aqueous pigment formulations may commonly include:

| | |
|---|---|
| about 0.5 to about 50 parts by weight | of at least one of the compounds of the general formula (I), |
| 0 to about 20 parts by weight | of dispersing resin, |
| about 5 to about 80 parts by weight | of pigment, |
| about 0.1 to about 5 parts by weight | of customary auxiliaries and additives (defoamers, biocides, antisettling agents, neutralizing agents, thickeners, humectants, stabilizing agents, siccatives, light stabilizers), |
| 0 to 30 parts by weight | of solvent |
| ad 100 parts by weight: | water. |

They may also be used for the let down with up to 100 times the amount of pairs by weight of clear varnish, or used for tinting white paint.

In aqueous paste systems the choice of the wetting and dispersing additive is dependent on the pigment used and on the coating system in which the paste is processed. In addition there are solvent-free pastes and glycol-containing pastes.

Naturally, additives in the coating film must not lead to any turbidity or loss of gloss.

The solubility of the additive in a highly concentrated binder solution is often taken as a criterion of the compatibility. Slight turbidity of the additive in the binder, however, may be attributable to the attachment groups or may even indicate the propensity of the additive to migrate with the hydrophobic fraction from the aqueous environment onto a hydrophobic pigment surface, so that in practice in the pigmented varnish it is still possible to obtain high-gloss coatings without turbidity.

EXAMPLES

For an overview the skilled worker normally conducts the following experiments: 1 g, 5 g or 10 g of dispersant are added to 50 g of binder solution, to take account of the varying dispersant demand of oxide pigments and organic pigments, and the propensity toward clouding (slight turbidity) or else coagulation (in the case of dispersions, for example) is observed in a glass vessel. This property can be quantified by subsequently applying the system to a transparent sheet and by subjecting it to colorimetry over a standardized black panel.

Rub-Out Test:

In order to make in particular the vertical floating of pigments in paint films visible and measurable it is possible to carry out the test known as the rub-out test. For this test the paint film while still wet though having already taken is rubbed with the finger or a brush. If the pigments have separated or are in highly flocculated condition, the mechanical operation of rubbing forces bring them into a homogeneous distribution again. The target shade of the homogeneous mixture is produced. From the difference in color relative to the unrubbed film the extent of the disruption is evident. The about effect obtained can be either positive or negative. A positive rub-out effect means that the color strength of the unrubbed film is lower than that of the rubbed film, possibly attributable to the floating of white pigment. The opposite situation produces a negative rub-out effect.

Sagging Test:

Deflocculating or weakly flocculating additives are suitably evaluated by means of a sagging test or a drawdown on a transparent film. The quality of different dispersing additives can be evaluated with criteria such as gloss, gloss haze, and possibly transparency.

Storage Stability:

A 100 ml sample of each of the pigment pastes prepared is placed in a glass bottle and the formation of sediment and clear serum is assessed on unstirred samples after 1, 3, and 6 months. After the corresponding period of time at rest the paste is inspected and the amount of clear serum over the paste is indicated in millimeters. A spatula is drawn carefully over the bottom of the paste and the remaining quantity of sediment is reported as "none", "little" or "much".

Viscosity Determination:

As well as the coloristic parameters determination of the viscosity of the resultant pigment pastes is an important criterion for assessing the wetting of the corresponding pigment surface. For such determination a variety of kinds of viscometers are used. Moreover, the constancy of the viscosity after 1, 3, and 6 months may serve to typify the permanence of the interaction between pigment and dispersant and so to guarantee the storage stability of the pastes.

Customary viscosity profiles which are measured are, for example, from 100 to 1 000 mPas in steps of 100 mPas in 180 s or from 100 to 1000 mPas with a pause at 100 mPas (held for 60 s) with an increase by 100 mPas to 1 000 mPas (held for 60 s) and back to 100 mPas. Various viscometers are employed for the measurement, such as Europhysics, RHEO 2000, for example.

Determination of the Calorimetric Values:

The pigmented paints and inks drawn down onto cardboard charts (Leneta® chart) are measured using a calorimeter (X-Rite, SP 62-162, illuminant D65/10, X-Rite) in the form of L*a*b* values (brightness, undertone on the red/green scale, undertone on the yellow/blue scale).

The examples below show first of all the preparation of organo-functionally modified polysiloxanes containing phenyl derivatives, of the formula (I), in accordance with the invention. The products prepared in these examples are labeled D1, D2, D3, and D4. The examples given are intended to illustrate the compounds of the invention but in no case to restrict the claim to the compounds set out below.

EXAMPLES 1 to 4

Example 1

In a 250 ml four-necked flask equipped with KPG stirrer, dropping funnel, intensive condenser and nitrogen blanketing 182.5 g of a copolymer prepared starting from allyl alcohol (composed of styrene and ethylene oxide units with a molar mass of 1 040 g/mol) together with 37.0 g of a pendant hydrosiloxane (SiH content: 3.51 eq/kg) were heated to 90° C. with stirring and 10 ppm of Pt in the form of cisdiamminoplatinum(II) chloride were added as catalyst. The SiC linking reaction begins spontaneously, and was evident in a slight exotherm. After 2.5 hours the determination of SiH by gas volumetry (decomposition of a weighed sample with sodium butoxide with evolution of hydrogen) indicate an SiH conversion of 99.6%. After the reaction mixture had been cooled the siloxane-polyether copolymer was isolated as viscous yellow liquid.

Example 2

In analogy to Example 1 211.4 g of a polyether prepared starting from 4-hydroxybutyl vinyl ether (composed of styrene and ethylene oxide units with a molar mass of 2 008 g/mol) together with 22.2 g of a pendant hydrosiloxane (SiH content: 3.51 eq/kg, structural type: M $D_{13}D^H{}_5$M) were heated with stirring to 90° C. and 10 ppm of Pt in the form of cisdiaminoplatinum (II) chloride were added as catalyst. In this very moderate reaction, over the course of 12 hours and with addition of further platinum catalyst (10 ppm), an SiH conversion of 96% (determined by gas volumetry) was achieved. The resulting copolymer was brown in color and of waxlike consistency.

Example 3

In an apparatus as described in Example 1 a mixture consisting of 213.2 g of a copolymer prepared starting from allyl alcohol (containing propylene oxide and ethylene oxide units, with a molar mass of 900 g/mol and a propylene oxide fraction of approximately 20%) and 12.17 g of styrene were heated to 90° C. with vigorous stirring and 10 ppm of Pt (in the form of $H_2PtCl_6 \cdot 6H_2O$ in solution in isopropanol) were added as catalyst. 40 g of a pendant hydrosiloxane (structural type: $MD_3D^H{}_5M$, SiH content: 7.3 eq/kg) were added dropwise over the course of 30 minutes at a rate such that the temperature of the reaction mixture did not exceed 120° C. After the end of the addition the mixture was stirred at 100° C. for about 3 hours. The SiH conversion, determined by gas volumetry, was >99%. A yellow, slightly mobile liquid was obtained.

Example 4

In a 250 ml four-necked flask equipped with KPG stirrer, dropping funnel intensive condenser and nitrogen blanketing 40 g of a pendant hydrosiloxane (SiH content: 2.79 eq/kg, structural type: $MD_{38}D^H{}_{10}M$) together with 156.8 g of a copolymer prepared starting from allyl alcohol (composed of styrene and ethylene oxide units, M: 1.040 g/mol) were heated to 90° C. with stirring and 10 ppm of Pt in form of cisdiamineplatinum(II) chloride were added as catalyst. After about 3 hours the determination of SiH by gas volumetry shows the SiC linking reaction to be 98% complete. A yellow siloxane-polyether copolymer of high viscosity was obtained.

Structure of the Siloxanes Forming the Basis of Examples D1, D2, D3 and D4

Hydrosiloxane for D1 and D2:

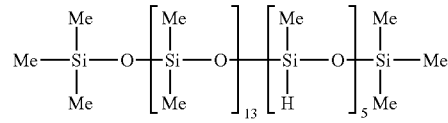

Hydrosiloxane for D3:

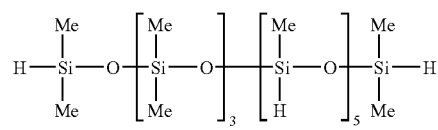

Hydrosiloxane for D4:

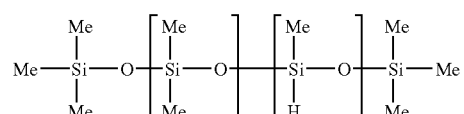

Starting products for the subsequent hydrosilylation were the following polyethers

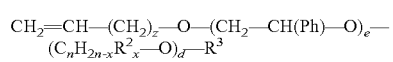

TABLE I

| Compound | z | Ph | e | n | x | $R^2$ | d | $R^3$ |
|---|---|---|---|---|---|---|---|---|
| PE 1 | 1 | $C_6H_5$ | 2 | 2 | 0 | — | 17 | H |
| PE 2* | 0 | $C_6H_5$ | 4 | 4/2 | 0 | — | 1/32 | H |
| PE 3** | 1 | — | 0 | 2/2 | 1/0 | $CH_3$/— | 3/15 | H |

*Definition: In PE 2 a polyether prepared starting from vinyl is defined with one mol of butylene oxide (n = 4, d = 1, x = 0) and 32 mol of ethylene oxide (n = 2, d = 32, x = 0) which additionally contains 4 mol of styrene oxide
**Definition: This polyether, prepared starting from allyl alcohol, contains 3 mol of propylene oxide (n = 2, x = 1, $R^2 = CH_3$) and 15 mol of ethylene oxide (n = 2, x = 0) and were used for preparing the polysiloxanes containing phenyl derivatives, denoted by the general formula (I), as dispersants for aqueous pigment pastes.

The residues and indices in this case have the definitions shown in Table II.

TABLE II

Compounds of formula (I)

| | a | b | $R^1$ | $R^{1'}$ | R |
|---|---|---|---|---|---|
| D 1 | 13 | 5 | 5x PE 1 | — | $CH_3$ |
| D 2 | 13 | 5 | 5x PE 2 | — | $CH_3$ |
| D 3* | 3 | 5 | 3x PE 3 | 2x styrene | $CH_3$ |
| D 4 | 38 | 10 | 10x PE 1 | — | $CH_3$ |

*Definition: In the siloxane molecule the polyether PE 3 (table I) is present three times, and the residue $R^{1'}$ (styrene) twice.

Noninventive comparative examples were the dispersants below, which were offered as commercial products for aqueous pigment pastes and can be typified by the data given below:
V 1 100% β-naphthol ethoxylate with about 10 ethylene oxide (EO) units;
V 2 100% ethoxylate of oleic acid with about 40 EO
V 3 40% strength aqueous solution of a high molecular mass styrene-maleic copolymer with polyether side chains
V 4 40% strength aqueous, neutralized solution of a polymeric acrylic acid.

The abovementioned inventive and noninventive comparative examples can be used to formulate the following pigment pastes following adjustment of 40% solids with distilled water (except for V 3 and V 4).

In order to test the technical properties of the siloxanes of the invention and of the formulations comprising them the siloxanes were used for preparing pigment pastes.

Preparation of Pigment Pastes:

Aqueous pigment pastes are prepared using from 0.1 to 80.0 parts by weight of the specially modified silicone polyether derivative, neutralized where possible, preferably from 0.5 to 50.0 parts by weight.

If the derivatives are not liquid or if small amounts for addition appear difficult owing to relatively high viscosities, it is advisable first to prepare before a 40 to 50% strength aqueous solution of the compound described in formula (I). In the context of their use in accordance with the invention such compounds are in any case introduced together with water, and then the corresponding pigments and fillers are incorporated, also including possible additions of glycol-containing solvents from 0 to 30 parts by weight, preferably from 0 to 10 parts by weight. In principle the dispersants claimed in accordance with the invention may also be introduced into the dispersing medium simultaneously with the pigment or filler or mixed with said medium before. The combined use of the compounds claimed in accordance with the invention with further, existing dispersants is of course included in the context of this application, since the skilled worker in any case operates in such a way as to obtain specific profiles of properties.

In order to describe the pigments a distinction will be made below between organic and inorganic pigments, and mention will also be made of the group of the carbon blacks in this context. Inorganic pigments should be considered as being titanium dioxide, different modifications of iron oxide, spinel pigments, and ultramarine pigments (H. Endriβ, Aktuelle anorganische Bunt-Pigmente, Vincentz, 1997).

For the group of the organic pigments the following are given by way of example (P. F. Gordon, P. Gregory, Organic Chemistry in Colour, Springer-Verlag, 1983; W. Herbst, K Hunger, Industrial organic pigments, VCH, 1993):
a) various azo pigments such as β-naphthol pigments, disazo pigments, Naphthol AS pigments, benzimidazolone pigments, isoindolinones or else azo-metal complex pigments;
b) polycyclic pigments such as phthalocyanine pigments, quinacridones, perylene pigments, dioxazines, and thioindigo types;
c) many other organic pigments, such as diketopyrrolopyrroles or quinophthalones.

Moreover, the dispersant structures of the invention are particularly suitable for the preparation of aqueous carbon black pastes.

For the group of the fillers which can be dispersed in aqueous ink and paint formulations examples include chalk talc, kaolins, and other silicatic fillers.

Following their use in pigment pastes the dispersants claimed in accordance with the invention can be made up with the entire spectrum of dispersion-based binders, such as pure acrylic dispersions, styrene acrylic dispersions, alkyd resin emulsions, and PU-modified versions, terpolymers based on PVAc, and hybrid dispersions (e.g. an alkyd-acrylate blend). They are additionally suitable for use in aqueous one-component and two-component coating materials in which OH-functional polyesters or polyacrylates are crosslinked with blocked ioscyanates or melamines. There is nothing to stand against their use in epoxy resin systems, and high-quality water-based so-called AA systems (OH-functional acrylate+epoxy-functional acrylate) are also relevant as acrylate systems.

System 1:

Formulation of the Color Paste:

General Conditions:

| | |
|---|---|
| demineralized water | 20.1 |
| dispersing additive, 40% solids as described above | 8.8 |
| defoamer Tego ® Foamex 830 | 1.0 |
| biocide Parmetol ® K 40 (Schülke & Mayr) stir until homogeneous | 0.10 |
| titanium dioxide KRONOS ® 2310 (KRONOS Int.) | 70.0 |

Stir in pigment, then disperse for 1 h with glass beads (1:1 volume/e.g. by means of shaker type BA-S 20K from Lau GmbH).

System 2:

Formulation of the Color Paste:

General Conditions:

| | |
|---|---|
| demineralized water | 47.8 |
| dispersing additive, 40% solids as described above | 29.7 |
| defoamer Tego ® Foamex 830 | 1.0 |
| biocide Parmetol ® K 40 (Schülke & Mayr) stir until homogeneous | 0.10 |
| carbon black Printex ® 95 (Degussa) | 20.0 |

Stir in pigment, then disperse for 2 h with glass beads (1:2 volume/e.g. by means of shaker type BA-S 20K from Lau GmbH).

System 3:

Formulation of the Color Paste:

General Conditions:

| | |
|---|---|
| demineralized water | 28.9 |
| dispersing additive, 40% solids as described above | 35.0 |
| defoamer Tego ® Foamex 830 | 1.0 |
| biocide Parmetol ® K 40 (Schülke & Mayr) stir until homogeneous | 0.10 |
| phthalocyanine Heliogenblau ® L 7101 F (BASF AG) | 35.0 |

Stir in pigment, then disperse for 2 h with glass beads (1:2 volume/e.g. by means of shaker type BA-S 20K from Lau GmbH).

System 4:

Formulation of the Color Paste:

General Conditions:

| | |
|---|---|
| demineralized water | 13.9 |
| dispersing additive, 40% solids as described above | 19.5 |
| defoamer Tego ® Foamex 830 | 1.0 |
| biocide Parmetol ® K 40 (Schülke & Mayr) stir until homogeneous | 0.10 |
| red iron oxide Bayferrox ® 140 M (Bayer AG) | 65.0 |

Stir in pigment, then disperse for 2 h with glass beads (1:1 volume/e.g. by means of shaker type BA-S 20K from Lau GmbH).

These inventive and noninventive pastes based on systems 2 and 3 were mixed, in accordance with the full mixing standard in the coatings industry, together with the corresponding titanium dioxide pastes (system 1) in a clear varnish based on an acrylic dispersion (Primal® HG 98 D, Rohm & Haas) in the following proportions: for 10 g of clear varnish 3.55 g of titanium dioxide paste were used. 0.49 g of carbon black paste (corresponding to a pigment ratio of 25:1) or 0.28 g of phthalocyanine paste (corresponding to a pigment ratio of 25:1) was mixed.

The stated mixtures were subsequently homogenized at 1 500 rpm for 5 minutes.

The formulation of the clear varnish used for this purpose is indicated below:

Formulation of the Clear Varnish 1:

| | |
|---|---|
| propylene glycol solvent | 4.0 |
| demineralized water | 4.0 |
| 25% ammonia neutralizing agent | 0.1 |
| Acrysol ® RM 1020 (Rohm & Haas) thickener | 4.1 |
| Tego ® Foamex 1488 defoamer | 0.7 |
| Texanol solvent | 5.0 |
| Primal ® HG 98 D (Rohm & Haas) binder | 72.0 |
| demineralized water | 10.1 |
| | 100.0 |

The inventive and noninventive color pastes (systems 2 and 3) can additionally be incorporated into a white paint based on an acrylic dispersion (NeoCryl® XK 90, NeoResins) which corresponds to the following formulation.

Formulation of the White Paint 1:

| | |
|---|---|
| propylene glycol solvent | 2.3 |
| demineralized water | 3.0 |
| AMP-90 ® (Angus) neutralizing agent | 0.2 |
| Tego ® Foamex 805 defoamer | 0.2 |
| Surfynol ® 104 E (Air Products) wetting agent | 0.4 |
| NeoCryl ® BT 24 (NeoResins) dispersing resin | 2.9 |
| KRONOS ® 2310 (KRONOS Int.) titanium dioxide | 21.4 |

Dispersed for 20 minutes at 6000 rpm using an automatic disperser from, for example, VMA Getzmann in a 1 000 ml stainless steel pot with a dissolver disk of d=60 mm

| | |
|---|---|
| Rheolate ® 278 (Rheox) thickener | 3.6 |
| butyl glycol solvent | 2.9 |
| methoxybutanol solvent | 3.1 |
| NeoCryl ® XK 90 (NeoResins) binder | 54.0 |
| Tego ® Foamex 805 defoamer | 0.4 |
| demineralized water | 5.6 |
| | 100.0 |

Additionally the inventive and noninventive color pastes (systems 2 and 3) were incorporated into a white paint based on a two-component polyurethane system (acrylate/isocyanate, Bayhydrol® VP LS 2235/1 and Bayhydur® VP LS 2319/80, Bayer AG) whose formulation corresponds to that below. The acrylate was crosslinked by mixing 100 parts by weight of white paint with 22 parts by weight of Bayhydur® VP LS 2319/80 (isocyanate component). 10 g of this before-mentioned binder/hardener mixture were homogenized either with 0.49 g of carbon black paste (system 2, corresponding to a pigment ratio of 35:1) or with 0.28 g of phthalocyanine paste (system 3, corresponding to a pigment ratio of 22:1) (by mixing at 1 500 rpm for 5 minutes) and after overnight drying the corresponding parameters were measured.

Formulation of the White Paint 2:

| | |
|---|---:|
| Bayhydrol ® VLS 2235/1 (Bayer AG) binder | 41.0 |
| Surfynol ® 104 E (Air Products) wetting agent | 1.0 |
| KRONOS ® 2310 (KRONOS Int.) titanium dioxide | 35.0 |
| Bayhydrol ® VPLS 2235/1 (Bayer AG) binder | 16.5 |
| Acrysol ® RM 8 20% in ethanol (Rohm & Haas) thickener | 0.6 |
| demineralized water | 5.9 |
| | 100.0 |

To determine the compatibility of the inventive and noninventive dispersants the titanium dioxide pastes (system 1) and phthalocyanine paste (system 3) were tested by making up 3.55 g of titanium dioxide paste with 10 g of the transparent varnish based on an alkyd resin dispersion (Uradil 5560 AZ, DSM). The mixture was homogenized at 1 500 rpm for 5 minutes.

Formulation of the Clear Varnish 2:

| | |
|---|---:|
| demineralized water | 11.45 |
| Uradil ® XP 5560 AZ (DMS) binder | 80.00 |
| Acrysol ® RM 8 (Rohm & Haas) thickener | 1.00 |
| Acrysol ® RM 2020 (Rohm & Haas) thickener | 4.40 |
| Additol ® VXW 4940 (Vianova) siccative | 0.70 |
| Tego ® Wet 280 wetting agent | 0.45 |
| propylene glycol solvent | 2.00 |
| | 100.0 |

Results:

Viscosities and Paste Stabilities

To assess the suitability of the inventive and noninventive dispersants the shear rate ($100^1/_s$ to $1\,000^1/_s$) was taken for systems 1, 2 and 3 or in the case of red iron oxide (system 4) the viscosity at low shear rate ($100^1/_s$) was tested and after 4 months the pastes were assessed for sedimentation and the formation of clear serum.

TABLE III

Viscosity profiles of the titanium dioxide pastes (system 1):

| | V1 | V2 | V3 | V4 | D1 | D2* | D3 | D4* |
|---|---|---|---|---|---|---|---|---|
| 100 | 3687 | 685 | 46 | 127 | 605 | 58 | 531 | 72 |
| 200 | 1805 | 402 | 42 | 90 | 278 | 45 | 304 | 61 |
| 300 | 1333 | 389 | 41 | 81 | 225 | 41 | 217 | 57 |
| 400 | 1113 | 254 | 40 | 77 | 183 | 36 | 158 | 53 |
| 500 | 951 | 221 | 39 | 73 | 140 | 34 | 122 | 51 |
| 600 | 842 | 197 | 38 | 71 | 102 | 33 | 100 | 47 |
| 700 | 745 | 169 | 37 | 68 | 83 | 33 | 94 | 44 |
| 800 | 671 | 145 | 37 | 67 | 72 | 33 | 79 | 42 |
| 900 | 624 | 132 | 36 | 67 | 60 | 32 | 68 | 40 |
| 1000 | 571 | 128 | 35 | 67 | 49 | 31 | 62 | 39 |

*Definition: In formulating the white pastes 30% of the stated dispersant were replaced by 30% of coadditive (phosphorylated polyether derivative) in order to lower the viscosity.

TABLE IV

Viscosity profiles of the carbon black paste (system 2):

| | V1 | V2 | V3 | V4 | D1 | D2 | D3 | D4 |
|---|---|---|---|---|---|---|---|---|
| 100 | 16 | 153 | 28 | 619 | 48 | 6 | 43 | 53 |
| 200 | 17 | 121 | 27 | 291 | 46 | 6 | 42 | 51 |
| 300 | 17 | 102 | 27 | 236 | 41 | 6 | 40 | 47 |
| 400 | 17 | 96 | 26 | 201 | 37 | 7 | 36 | 43 |
| 500 | 17 | 91 | 26 | 176 | 32 | 8 | 33 | 41 |
| 600 | 16 | 87 | 25 | 157 | 29 | 8 | 31 | 39 |
| 700 | 16 | 85 | 24 | 143 | 26 | 8 | 28 | 36 |
| 800 | 16 | 83 | 24 | 132 | 24 | 9 | 26 | 35 |
| 900 | 16 | 82 | 23 | 123 | 22 | 9 | 24 | 34 |
| 1000 | 16 | 81 | 23 | 116 | 21 | 9 | 22 | 34 |

TABLE V

Viscosity profiles of the phthalocyanine pastes (system 3):

| | V1 | V2 | V3 | V4 | D1 | D2 | D3 | D4 |
|---|---|---|---|---|---|---|---|---|
| 100 | 44 | 62 | 566 | 906 | 51 | 226 | 236 | 87 |
| 200 | 43 | 59 | 370 | 475 | 45 | 126 | 159 | 79 |
| 300 | 42 | 57 | 309 | 371 | 38 | 104 | 136 | 73 |
| 400 | 42 | 56 | 269 | 326 | 35 | 91 | 122 | 69 |
| 500 | 40 | 54 | 240 | 240 | 32 | 81 | 111 | 66 |
| 600 | 40 | 54 | 219 | 218 | 30 | 74 | 103 | 63 |
| 700 | 39 | 53 | 203 | 202 | 28 | 72 | 97 | 60 |
| 800 | 39 | 53 | 190 | 188 | 27 | 65 | 92 | 58 |
| 900 | 38 | 53 | 179 | 177 | 26 | 62 | 88 | 56 |
| 1000 | 38 | 52 | 169 | 173 | 25 | 59 | 84 | 55 |

TABLE VI

Assessment of the red iron oxide pastes (system 4):

| Bayferrox 130 M | Viscosity 100⅕ in mPas | Sediment (after 4 weeks at room temperature) | Supernatant (mm) (after 4 weeks at room temperature) |
|---|---|---|---|
| V 1 | | not determinable | |
| V 2 | 642 | much | 8 |
| V 3 | 258 | little | 7 |
| V 4 | 312 | much | 11 |
| D 1 | 215 | little | 2 |
| D 2 | 234 | none | 4 |
| D 3 | 193 | little | 1 |
| D 4 | 248 | none | 2 |

Viewing the viscosities set out above which can be achieved for organic or inorganic pigments, the distinct suitability of the inventive dispersants D 1 to D 4 as compared with the comparative examples is very evident. In the case of the comparative examples either it is impossible to use them universally on oxide and hydrophobic organic pigment surfaces (pastes are of much higher viscosity or cannot be prepared) or relatively severe settlement occurs during storage, as shown using red iron oxide as an example.

Colorimetric Results and Gloss Assessment:

TABLE VII

System 1 and 2 with clear varnish 1 (full mixing):

| | Lightness L* | Rub-out ΔE | Gloss 20° |
|---|---|---|---|
| V 1 | 46.93 | 1.34 | 32.4 |
| V 2 | 48.27 | 2.73 | 28.4 |
| V 3 | 45.10 | 4.22 | 30.0 |

TABLE VII-continued

System 1 and 2 with clear varnish 1 (full mixing):

| | Lightness L* | Rub-out ΔE | Gloss 20° |
|---|---|---|---|
| V 4 | 51.43 | 3.27 | 26.1 |
| D 1 | 45.44 | 1.28 | 44.3 |
| D 2 | 44.27 | 0.24 | 43.6 |
| D 3 | 45.78 | 0.85 | 32.7 |
| D 4 | 44.95 | 1.07 | 38.5 |

TABLE VIII

System 2 or 3 in white paint 1:

| | System 2 | | | System 3 | | |
|---|---|---|---|---|---|---|
| | Lightness L* | Rub-out ΔE | Gloss 20° | Lightness L* | Rub-out ΔE | Gloss 20° |
| V1 | 45.11 | 2.14 | 23.2 | 63.63 | 1.55 | 19.5 |
| V2 | 46.25 | 3.51 | 28.5 | 65.28 | 2.03 | 24.2 |
| V3 | 45.31 | 1.82 | 30.6 | 64.92 | 0.97 | 31.6 |
| V4 | 49.54 | 2.95 | 21.7 | 67.57 | 3.02 | 18.5 |
| D1 | 44.91 | 1.80 | 32.9 | 64.66 | 0.76 | 33.2 |
| D2 | 43.48 | 0.95 | 41.3 | 64.88 | 0.87 | 35.0 |
| D3 | 44.54 | 1.80 | 40.1 | 63.82 | 0.51 | 31.9 |
| D4 | 43.98 | 1.08 | 36.1 | 64.05 | 0.83 | 34.2 |

It is clearly evident that through the use of the inventive dispersants high color strengths (low L* values), low rub-outs, and high development of gloss can be guaranteed both in full mixing and in tinting of the white paints of acrylate dispersions, these advantages in combination being relevant for the user.

TABLE IX

System 2 or 3 in white paint 2:

| | Lightness L* | Rub-out ΔE |
|---|---|---|
| | System 2 | |
| V 1 | 47.85 | 0.83 |
| V 2 | 49.06 | 2.86 |
| V 3 | 47.99 | 1.30 |
| V 4 | 53.24 | 4.38 |
| D 1 | 47.32 | 0.65 |
| D 2 | 46.89 | 0.25 |
| D 3 | 47.14 | 0.71 |
| D 4 | 47.54 | 0.63 |
| | System 3 | |
| V 1 | 67.73 | 0.67 |
| V 2 | 69.25 | 0.73 |
| V 3 | 64.12 | 0.68 |
| V 4 | 72.38 | 2.14 |
| D 1 | 64.10 | 0.48 |
| D 2 | 63.54 | 0.27 |
| D 3 | 64.02 | 0.53 |
| D 4 | 63.81 | 0.61 |

Note:
The gloss values of this two-component PU system were unsuitable for differentiation, because very high gloss values were observable in all cases.

In the abovementioned crosslinking polyurethane system the performance of the inventive dispersants is evident from the development in depth of color in combination with low rub-out values.

TABLE X

System 1 in clear varnish 2:

| | Gloss 20° |
|---|---|
| V 1 | 51.5 |
| V 2 | 62.4 |
| V 3 | 80.6 |
| V 4 | 49.5 |
| D 1 | 83.2 |
| D 2 | 81.7 |
| D 3 | 80.8 |
| D 4 | 82.5 |

The high gloss values of the titanium dioxide pastes based on the inventive dispersants made up with alkyd resin emulsion (clear varnish 2) indicate clearly that the dispersants D1 to D4 can be used successfully for the stabilization of titanium dioxide. In other words, the white pigment reaches a very low fineness of grind with ≦10 μm and the dispersants of the invention display no incompatibility, which would be manifested in the form of a reduction in gloss or the development of haze.

The foregoing comparisons distinguish the compounds for use in accordance with the invention, based on the example of D1 to D4 (but not exclusively restricted to these examples), in terms of their universal applicability on different kinds of pigment surfaces (oxide pigments, organic pigments, and carbon blacks). Obtained on the basis of these innovative structures are low-viscosity pigment pastes of relatively high stability during storage, high degree of development of depth of color, and low rub-out (both in full mixing and in the tinting of white paint), and even sensitive systems are not adversely affected in terms of their development of gloss.

The above description is intended to be illustrative and not limiting. Various changes and modifications in the embodiments described herein may occur to those skilled in the art. Those changes can be made without departing from the scope or spirit of the invention.

What is claimed is:

1. An aqueous pigment formulation which comprises about 5 to about 80 parts by weight of a pigment, 0 to about 20 parts by weight of a dispersing resin, about 0.1 to about 5 parts by weight of at least one auxiliary and/or additive, 0 to 20 parts by weight solvent about 3 to about 50 parts by weight of at least one organofunctional modified polysiloxane of the general formula

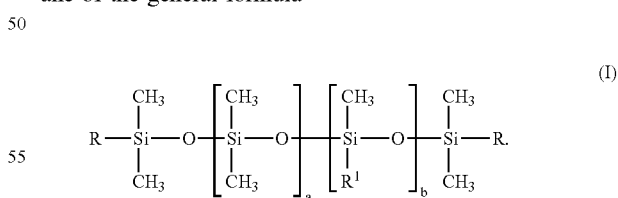

(I)

in which
R is in each case identical or different and is $R^1$ or —$CH_3$,
$R^1$ is —$(CH_2)_e$—O —$(CH_2$—$CH(Ph))$—$O)_e$—$(C_nH_{2n-x}R^2_x$—$O)_d$—$R^3$ wherein e is ≧1, or
$R^1$ is at least one —$(CH^2)_e$—O—$(CH_2$—$CH(Ph)$—$O)_e$—$(C_nH_{2n-x}R^2_x$—$O)_d$—$R^3$ and is at least one —$CH_2$—$CHR^*$—Ph wherein e is 0 or >1, with the proviso that if e is 0 the value of b is an integer >1;
R* is H or —$CH_3$, $R^2$ is an alkyl residue having 1 to 5 carbon atoms, Ph is a phenyl derivative having the general formula

in which $R^4$ is a hydroxyl residue, an alkyl residue or an alkoxy residue, and y is from 0 to 5, $R^3$ is hydrogen, an alkyl chain, a benzyl residue, an alkyl-substituted benzyl residue, a group $COR^5$ with a residue $R^5$ which has an alkyl chain, a group $CONHR^6$ with a residue $R^6$ which comprises a hydrogen atom or an alkyl chain, or $CO_2R^7$, wherein $R^7$ is alkyl chain, c is from 2 to 6, d is from 3 to 70, n is from 2 to 4, x is 0 or 1, a is from 0 to 100, b is from 1 to 100, with the proviso that a+b=1 to 100; and the remainder water.

2. The aqueous pigment formulation according to claim 1, wherein the pigment is an organic pigment.

3. The aqueous pigment formulation according to claim 2, wherein the organic pigment is an azo pigment, a polycyclic pigment, a diketopyrrrolopyrrole or a quinophthalone.

4. The aqueous pigment formulation according to claim 1, wherein the pigment is an inorganic pigment.

5. The aqueous pigment formulation according to claim 1, wherein the inorganic pigment is an iron oxide, a spinel pigment, an ultramarine pigment titanium dioxide, or carbon black.

6. An aqueous pigment formulation of claim 1, wherein the at least one organofunctional modified polysiloxane of the general formula

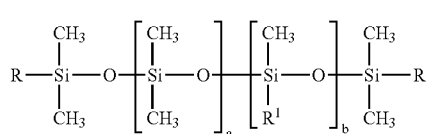

in which

R is in each case identical or different and is $R^1$ or $—CH_3$, $R^1$ is $—(CH_2)_e—O—(CH_2—CH(Ph)—O)_e—(C_aH_{2n-x}R^2_x—O)_d—R^3$ wherein e is >1, or $R^1$ is at least one $—(CH^2)_c—O—(CH_2—CH(Ph)—O)_e—(C_nH_{2n-x}R^2_x—O)_d—R^3$ and is at least one $—CH_2—CHR^*—Ph$ wherein e is 0 or $\geq 1$, with the proviso that if e is 0 the value of b is an integer >1;

$R^*$ is H or $—CH_3$, $R^2$ is an alkyl residue having 1 to 5 carbon atoms, preferably $—CH_3$, Ph is a phenyl derivative having the general formula

in which $R^4$ is a hydroxyl residue, an alkyl residue or an alkoxy residue, and y is from 0 to 5, $R^3$ is hydrogen, an alkyl chain, a benzyl residue, an alkyl-substituted benzyl residue, a group $COR^5$ with a residue $R^5$ which has an alkyl chain, a group $CONHR^6$ with a residue $R^6$ which comprises a hydrogen atom or an alkyl chain, or $CO_2R^7$ wherein $R^7$ is an alkyl chain, c is from 2 to 6, d is from 3 to 70, n is 2 or 3, x is 0 or 1, a is from 0 to 100, b is from 1 to 100, with the proviso that a+b=1 to 100; and further optionally comprises a filler.

7. A method for dispersing at least one pigment and optionally a filler in the aqueous pigment formulation of claim 1 said process comprises mixing in an aqueous dispersing medium the pigment and optionally the filler with at least one organofunctional modified polysiloxane of the general formula

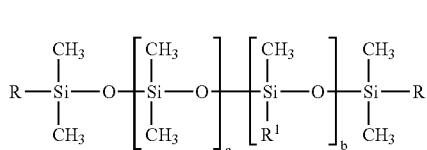

in which

R is in each case identical or different and is $R^1$ or $—CH_3$, $R^1$ is $—CH_2)_c—O—(CH_2—CH(Ph)—O)_e—(C_nH_{2n-a}R^2_x—O)_d—R^3$ wherein e is $\geq 1$, or $R^1$ is at least one $—(CH^2)_e—O—(CH_2—CH(Ph)—O)_e—(C_nH_{2n-x}R^2_x—O)_d—R^3$ and is at least one $—CH_2—CHR^*—Ph$ wherein e is 0 or $\geq 1$, with the proviso that if e is 0 the value of b is an integer >1;

$R^*$ is H or $—CH_3$, $R^2$ is an alkyl residue having 1 to 5 carbon atoms,

Ph is a phenyl derivative having the general formula

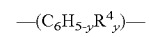

in which $R^4$ is a hydroxyl residue, an alkyl residue or an alkoxy residue, and y is from 0 to 5, $R^3$ is hydrogen, an alkyl chain, a benzyl residue, an alkyl-substituted benzyl residue, a group $COR^5$ with a residue $R^5$ which has an alkyl chain a group $CONHR^6$ with a residue $R^6$ which comprises a hydrogen atom or an alkyl chain, or $CO_2R^7$, wherein $R^7$ is alkyl chain, c is from 2 to 6, d is from 3 to 70, n is from 2 to 4, x is 0 or 1, a is from 0 to 100, b is from 1 to 100, with the proviso that a+b=1 to 100.

8. The method according to claim 7 wherein the organofunctional modified polysiloxane is a compound of the formula

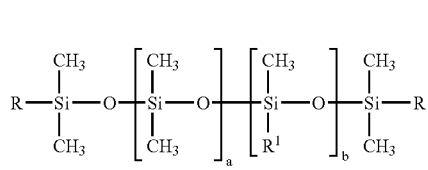

(I)

in which
R is in each case identical or different and is $R^1$ or —$CH_3$,
$R^1$ is —$(CH_2)_c$—O —$(CH_2$—$CH(Ph)$—$O)_e$—$(C_nH_{2n-x}R^2_x$—$O)_d$—$R^3$ wherein e is $\geq 1$, or
$R^1$ is at least one —$(CH^2)_e$—O—$(CH_2$—$CH(Ph)$—$O)_e$—$(C_nH_{2n-x}R^2$—$O)_d$—$R^3$ and is at least one —$CH_2$—$CHR^*$—Ph wherein e is 0 or $\geq 1$, with the proviso that if e is 0 the value of b is an integer >1;
$R^*$ is H or —$CH_3$,
$R^2$ is an alkyl residue having 1 to 5 carbon atoms,
Ph is a phenyl derivative having the general formula —$(C_6H_{5-y}R^4_y)$— in which
$R^4$ is a hydroxyl residue, an alkyl residue having 1 to 6 carbon atoms or an alkoxy residue having 1 to 6 carbon atoms, and
y is from 0 to 5,
$R^3$ is hydrogen, an alkyl chain having 1 and up to 18 carbon atoms, a benzyl residue, an alkyl-substituted benzyl residue having up to four carbon atoms in the alkyl residue, a group $COR^5$ with a residue $R^5$ which has an alkyl chain having 1 to 18 carbon atoms, a group $CONHR^6$ with a residue $R^6$ which comprises a hydrogen atom or an alkyl chain having 1 to 18 carbon atoms, or $CO_2R^7$, which has an alkyl chain $R^7$ having 1 to 18 carbon atoms,
c is from 2 to 6,
d is from 3 to 70,
n is from 2 to 4,
x is 0 or 1,
a is from 0 to 100,
b is from 1 to 100,
with the proviso that a+b=1 to 100.

9. The method according to claim 7, wherein $R^1$ in formula (I) is the residue —$(CH_2)_{2-3}$—O —$(CH_2$—$CH(Ph)$—$O)_{1-4}$—$(C_2H_4$—$O)_{3-50}$—H.

10. The method according to claim 7 where the aqueous pigment formulation comprises a filler.

11. The aqueous pigment formulation according to claim 7 wherein the filler is chalk, talc, kaolin or silicate.

12. The aqueous pigment formulation according to claim 7, which further comprises the auxiliary and/or additive is a defoamer, biocide, antisettling agent, neutralizing agent, thickeners, humectant, stabilizing agent, siccative, light stabilizer.

* * * * *